June 26, 1956        E. F. KURTZ        2,752,454

EXTERNALLY RESETTABLE HERMETICALLY SEALED THERMOSTAT

Filed Oct. 22, 1954

Inventor,
Edward F. Kurtz.
by Townsend M. Jenny
Atty.

United States Patent Office 2,752,454
Patented June 26, 1956

2,752,454

EXTERNALLY RESETTABLE HERMETICALLY SEALED THERMOSTAT

Edward F. Kurtz, Attleboro, Mass., assignor to Metals & Controls Corporation, Attleboro, Mass., a corporation of Massachusetts Application October 22, 1954, Serial No. 463,949

12 Claims. (Cl. 200—138)

This invention relates to hermetically sealed thermostatic switches, and in particular to externally resettable thermostatic switches of the above general class.

The general object of this invention is to provide a thermostatic switch and electrical connections thereto in which the contacts are maintained predeterminedly in either open or closed positions after a single operation of the thermostat element of the switch, the contacts being thereafter externally resettable to the other position, the whole switch being hermetically sealed and the resetting means being actuable from outside the switch.

Another object of this invention is the provision of a switch of the above class in which the electrical connections to the switch are sealed off in such a way that moisture cannot cause a short-circuit across the terminals, nor a short-circuit to ground.

Another object of the invention is the provision of an electrical switch of the above classes in which the reset mechanism is simple and economical to make.

Other objects and advantages of the invention will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Similar reference characters indicate corresponding parts throughout the several views of the drawings.

Figure 1:
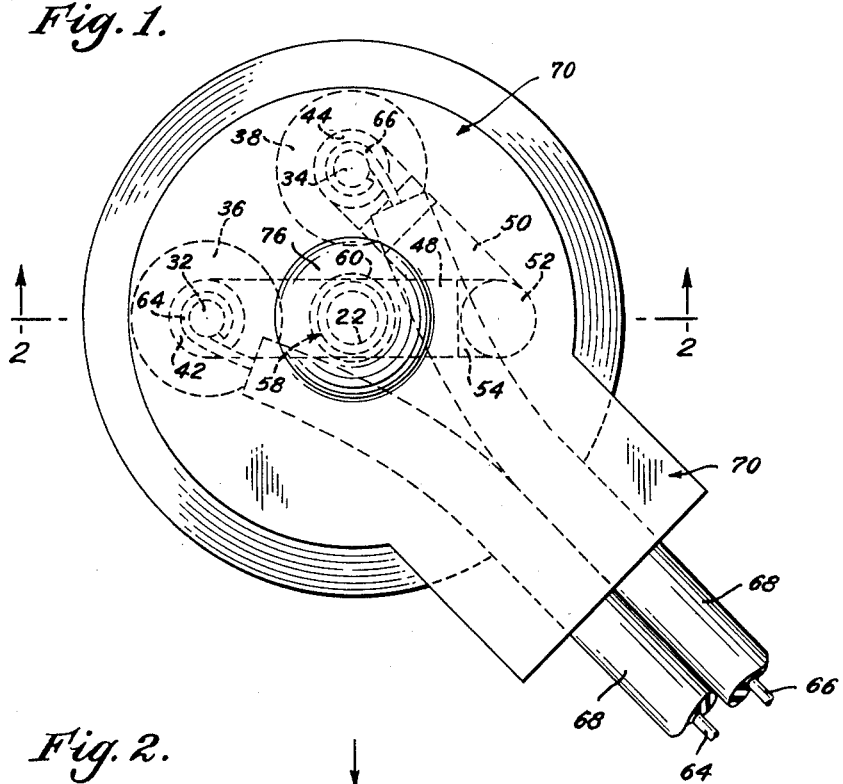
Fig. 1 is a plan view of one embodiment of the present invention.

This invention is an improvement over the device shown and claimed in United States Letters Patent No. 2,667,553. Therein is shown a hermetically sealed switch which is automatic in its operation. That is, on change of temperature in one direction, the thermostat element snaps in one direction. Upon reversal of the change of temperature, the thermostat element moves in an opposite direction. Thus the electrical contacts of the device are automatically opened and closed as the thermostat snaps back and forth. What is needed for many uses, however, is a hermetically sealed switch in which the contacts are kept in the open (or alternatively, the closed position) to which they are moved by the thermostat element until they are reset by application of a force external to the switch, even though the temperature of the thermostat element changes back to an original temperature. The difficulty has been to provide such a hermetically sealed externally resettable switch with simple and economical means to reset the contacts and the thermostat element from outside the switch.

This is particularly difficult where the device in question must be completely hermetically sealed, that is, no entrance for water vapor can be tolerated, no matter how minute. This makes inadvisable the use of the usual kinds of rotating valve seals, etc. Limitations in size and expense make undesirable the use of metal bellows to accomplish the movable seal. The present invention, however, provides an inexpensive and yet simple and foolproof solution to these problems.

Referring now to the drawings, there is shown (as in said United States Letters Patent) a container 2 of generally cylindrical shape, and preferably made of copper for heat conductivity, although other metals such as steel or brass can be used. The can 2 is provided with the shoulders 4 and 6. Resting on shoulder 4 is the snap-acting thermostat element 8 of the type shown, for example, in United States Patent No. 1,448,240. Since the use and operation of such an element is well understood in the art, no further description will be given herein, except to say that the temperatures set in this snap-acting element are such that the temperature required for automatic reset is outside the range of temperatures to which the device will be subjected and thus is never attained. Thus, once the element has snapped to the contact-open position shown in Fig. 2, it will not snap back to its original position (in which it is curved in the downward direction) at any temperature normally assumed by the thermostatic switch in use. That is, this is the kind of snap-acting element that is sometimes known as a "manually-resettable" thermostatic element. It must be pushed into the contact-closed position by the application of a force external to the element itself.

Snugly fitting the inside of can 2 is a cylindrical copper cup-like shell 10, this shell fitting tightly enough into the inside of can 2 so as to stay in place without any further riveting or welding operations, although the latter can be used if desired. One purpose of shell 10 is to maintain the snap-acting element 8 in place, and it will be noticed that for this purpose shell 10 has a shoulder 12 therein which mates with the shoulder 6 of the can 2, to position the shell 10 so as to leave a space 14 between the bottom 16 of the shell and the shoulder 4, this space providing clearance for the snap-acting element 8 so that the latter will not be bound and thus can snap freely. Shell 10 is provided with a central hole, and in this hole is riveted or otherwise fastened the guide bushing 18, bushing 18 being provided with a hole 20 in which slides freely the push rod 22. Push rod 22 may be made of insulating material, such as one of the molded resins or a ceramic material. Also, snugly fitting the inside of can 2 is the cup 24 of insulating paper, cup 24 being provided with a hole in its bottom which fits around the bushing 18.

Hermetically sealed and attached to the top of the can 2, as by the solder 26, is the header plate 28, this plate being provided with the turned-down lip 30 which in conjunction with the vertical wall of can 2 provides a groove adapted to receive the solder 26. Header plate 28 is provided with the two terminals 32 and 34, these being mounted in the top of the plate and being hermetically sealed thereto but electrically insulated therefrom by means of the customary glass seals 36 and 38. Header plate 28 is provided with a central hole 40, the purpose of which will be described later in this description.

Each of the terminals 32 and 34 has provided at its inner end the heads 42 and 44 (all as described in said United States Letters Patent No. 2,667,553), and attached thereto (as by welding) are the movable spring contact arm 48 and the stationary contact arm 50, respectively. Each of the ends of these contact arms is provided with electrical contact materials 52 and 54, respectively, and these ends overlap so that the contact materials make contact mechanically and electrically with each other. As explained in said Letters Patent, the welding caps 56 may be provided, if desired, to assist in welding the contact arms to their respective heads and to provide additional strength.

It will be noted that the movable contact arm 48 is arranged to lie approximately across the center of the container 2, and thus lies over and is contacted by the push rod 22. Thus, when the snap-acting element 8 snaps to the upward position shown in Figure 2, it pushes the push rod 22 up and the latter pushes the movable contact arm 48 into the contact-open position shown in Fig. 2.

Slidably mounted in the hole 40 is the reset actuator or push-rod 58. This is preferably made of insulating material such as Bakelite, or one of the other molded resins, or may be a strong ceramic or porcelain material if desired. Push rod 58 is cylindrical in shape, and is of two diameters, the larger diameter 60 being of such size as to provide a sliding fit in hole 40, and the smaller diameter 62 being provided above the hole 40 as shown. The purpose of the smaller diameter is to provide a friction-free fit in the rubber overmold on the header plate 28, which will now be described.

Attached to each of the terminals 32 and 34, as by soldering, are the conducting wires 64 and 66. Each of these wires is provided with the moisture-proof insulating material 68, which may be, for example, rubber or one of the proper silicone materials. It will be noted that the insulating material 68 in each case lies across the header plate almost up to the terminals 32. Molded about the terminals, the glass seals 36 and 38, the insulating material 68, and attached to the header plate 28 during the molding process in customary manner, is what is hereinafter called the overmold or cap 70. Cap 70 becomes firmly and integrally bonded to the insulating material 68, to the terminals 32 and 34, and to the header plate 28. Thus, there is provided a complete hermetically sealed enclosure which prevents any moisture from reaching the interior of the can 2. In addition, no moisture can ever extend across the terminals 32 and 34, because any moisture or water vapor that might pass down the insulating material 68 along, for example, wire 66, to the terminal 34, is thereafter barred from extending further because of the surrounding overmold 70. Thus, there is provided that degree of moisture-proofness which is so highly desirable in electric switches of this kind which are to be used in, for example, electric refrigerators. For a further understanding of the desirability of this, attention is again called to said United States Letters Patent.

During the molding of the overmold 70 to the header plate 28, an insert is provided in the hole 40 so as to provide, after the molding is done and after the insert is removed, a well 72 in the overmold 70 which is in register with the hole 40. This well extends above the top level 74 of the overmold, and a thin flexible dome or diaphragm 76 of the rubber or silicone is provided at the top of the well. This well contains the reset push rod 58 freely slidable.

Figure 2:
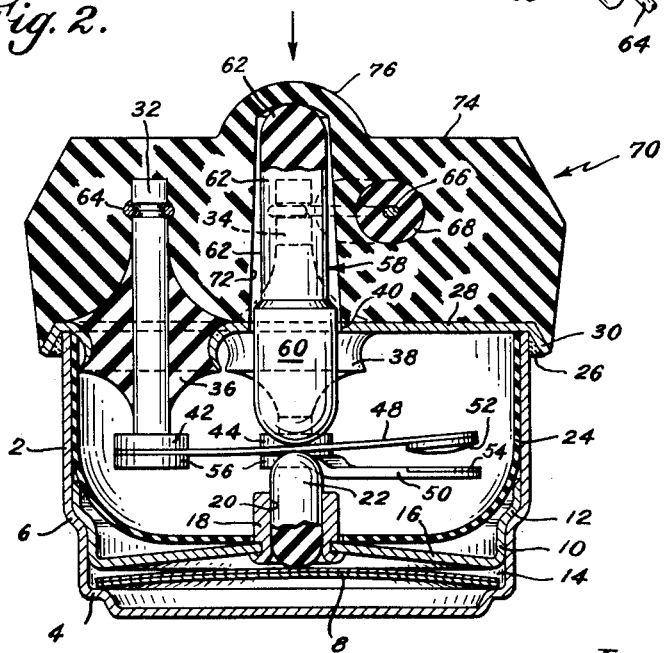
Fig. 2 is a sectional view taken on Fig. 1 in the direction of sight lines 2—2 thereon.

In operation, after the thermostat element 8 has become heated and has snapped to the position shown in Figure 2, thus raising the movable contact arm 48 and separating the contacts 52 and 54, the motion of the arm 48 raises the push rod 58 upwardly to the position shown in Figure 2. In order to reset the device, the flexible dome 76 can be pushed downwardly in the direction of the arrow, either manually or by other applied external force, thus pushing the push rod 58 downwardly. This in turn bears against the contact arm 48, and thence against the push rod 22, to thrust the latter downward against the thermostat element 8. This thrusting downward is continued until the thermostat element 8 is "manually reset," that is, until it snaps back to its normal position. Thereafter, release of the flexible diaphragm 76 will allow this to move upwardly under its own resilience, thus leaving a clear space between the end of push rod 58 and the inside of dome 76 for the push rod to move upwardly again upon motion of the thermostat element 8.

It will be noted that the reduction in diameter of the end 62 of the push rod 58 gives ample clearance for this end of the push rod, so that the push rod does not bind (frictionally) against the walls of the well 72. The well itself is made tapered, as shown, both to permit easy removal of the aforementioned mold insert, and to provide a top portion whose diameter is not much greater than the diameter 62 of the small end of the push rod. Thus the push rod is guided at top and bottom.

Thus, it is seen that there is provided a completely hermetically sealed externally resettable thermostatic switch, in which the reset mechanism is completely enclosed within the device itself. At the same time, the number of movable parts is kept to a minimum. This leads to economy of manufacture, and reliability of operation.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. An externally-resettable sealed thermostat comprising a container; a closure plate closing an opening into said container; a thermostat element operatively mounted in said container; control means within said container positioned to be moved by said element; a cap of molded and flexible moisture-proof material covering at least a portion of the exterior of said closure plate, said closure plate being provided with a hole therethrough and said cap having a thin diaphragm section closing said hole; and movable means positioned between said diaphragm section and said thermostatic element, said movable means being movable by pressure on said diaphragm to reset said thermostat element and said control means.

2. An externally-resettable sealed thermostat comprising a container; a closure plate closing an opening into said container; a thermostat element operatively mounted in said container; at least two terminals electrically insulated from each other and mounted on said closure plate, said terminals projecting through said plate from one side thereof to the other; switch means in said container and connected to said terminals, said thermostat element being adapted to move said switch means so as to make and break an electric circuit between said terminals; a molded moisture-proof electrically insulating cap covering at least the exterior surface of said closure plate and said terminals, thereby to form a moisture-tight covering for said terminals and said plate, said closure plate being provided with a hole therethrough and said cap having a thin diaphragm section closing said hole; and movable means positioned between said diaphragm section and said thermostatic element, said movable means being movable by pressure on said diaphragm to reset said thermostat element and said control means.

3. An externally-resettable sealed thermostat comprising a container; a closure plate closing an opening into said container; a thermostat element operatively mounted in said container; control means within said container positioned to be moved by said element; a cap of molded and flexible moisture-proof material covering at least a portion of the exterior of said closure plate and bonded thereto, said closure plate being provided with a hole therethrough and said cap being provided with an interior well having one end open and centering with said hole and a closed exterior end, said closed exterior end comprising a flexible diaphragm forming an integral part of said cap; and movable means positioned in said hole and said well and extending into the interior of said container, said movable means being movable by pressure on said diaphragm.

4. The thermostat of claim 3 in which said movable means comprises a cylindrical rod axially slidable in said well and through said hole, the outer end of said rod being engageable by flexing said diaphragm, and the inner end of said rod being positioned to actuate said thermostat element.

5. An externally-resettable sealed thermostat comprising a container; a closure plate closing an opening into said container; a thermostat element operatively mounted in said container; control means within said container positioned to be moved by said element; a cap of molded and flexible moisture-proof material covering at least a portion of the exterior of said closure plate and bonded thereto, said closure plate being provided with a hole therethrough and said cap being provided with an interior well having one end open and centering with said hole and a closed exterior end, said closed exterior end comprising a flexible diaphragm forming an integral part of said cap; and movable means positioned in said hole and said well and extending into the interior of said container, said movable means being movable by pressure on said diaphragm and comprising a cylindrical rod having one end portion larger in diameter than the other end portion, the wall of said well tapering inwardly from said hole to provide a decreasing diameter toward said diaphragm, the said one end portion of the cylindrical rod being a slidable fit in said hole, and the said other end portion of said rod being a loose fit at the diaphragm-end of said well, whereby said movable means is axially guided by said hole and the diaphragm-end of said well.

6. An externally-resettable sealed thermostat comprising a container; a closure plate closing an opening into said container; a thermostat element operatively mounted in said container; control means within said container positioned to be moved by said element; a cap of molded and flexible moisture-proof material covering at least a portion of the exterior of said closure plate and bonded thereto, said closure plate being provided with a hole therethrough and said cap being provided with an interior well having one end open and centering with said hole and a closed exterior end, said closed exterior end comprising a flexible diaphragm forming an integral part of said cap; and movable means positioned in said hole and said well and extending into the interior of said container, said movable means being movable by pressure on said diaphragm, said thermostat element comprising a snap-acting thermostatic disc; the wall of said container being formed to provide a pair of inwardly extending shoulders at that end of the container away from said closure plate, one of said shoulders having a greater inside diameter than the other and said shoulders being longitudinally spaced apart a distance greater than the thickness of said disc; and a retaining element of metal having a high coefficient of heat conductivity fastened on and extending inwardly over said other shoulder, said disc being loosely held in said container at its periphery in the space thus provided between said other shoulder and said retaining element.

7. An externally-resettable hermetically sealed thermostatic switch comprising a container; a header plate hermetically closing the open end of said container; at least two terminals electrically insulated from each other and mounted on said plate, said terminals projecting through the plate from one side thereof to the other; switch means in said container and connected to said terminals; a thermostat element within said container and adapted to move said switch means so as to make and break an electric circuit between said terminals; a molded moisture-proof electrically insulating cap bonded to and covering at least the exterior surface of said header plate and said terminals, thereby to form a moisture-tight covering for said terminals and said plate, said header plate being provided with a hole therethrough and said cap being provided with an interior cylindrical well having one end open and registering with said hole and having the other exterior end closed by a flexible diaphragm forming an integral part of said cap; and movable means positioned in said hole and said well and extending into the interior of said container, said movable means being movable by external pressure on said diaphragm.

8. An externally-resettable hermetically sealed thermostatic switch comprising a container; a header plate hermetically closing the open end of said container; at least two terminals electrically insulated from each other and mounted on said plate, said terminals projecting through the plate from one side thereof to the other; switch means in said container and connected to said terminals; a thermostat element within said container and adapted to move said switch means so as to make and break an electric circuit between said terminals; a molded moisture-proof electrically insulating cap bonded to and covering at least the exterior surface of said closure plate and said terminals, thereby to form a moisture-tight covering for said terminals and said plate, said closure plate being provided with a hole therethrough and said cap being provided with an interior cylindrical well having one end open and registering with said hole and having the other exterior end closed by a flexible diaphragm forming an integral part of said cap; and movable means positioned in said hole and said well and extending into the interior of said container, said movable means being movable by external pressure on said diaphragm and comprising a cylindrical rod axially slidable in said well and through said hole, the outer end of said rod being engageable by flexing said diaphragm and the inner end of said rod being positioned to actuate said thermostat element.

9. An externally-resettable hermetically sealed thermostatic switch comprising a container; a header plate closing the open end of the container; at least two terminals electrically insulated from each other and mounted on said plate, said terminals projecting through the plate from one side thereof to the other; switch means within said container and connected to said terminals; a thermostatic element within the container and adapted to move said switch means so as to make and break an electric circuit between said terminals; electrical conductors attached to said terminals on the exterior side of said plate, said conductors being covered with moisture-proof electrically insulating material; and a molded moisture-proof electrically insulating cap covering at least the exterior surface of said header plate, said terminals, and a portion of said moisture-proof electrically insulating material, said cap being bonded to said moisture-proof electrically insulating material, and to said header plate, thereby to form a moisture-tight covering for said terminals and conductors; said header plate being provided with a hole therethrough and said cap being provided with an interior cylindrical well having one end open and registering with said hole and having the other exterior end closed by a flexible diaphragm forming an integral part of said cap; and slidable means slidably mounted in said hole and said well and extending into the interior of said container, said slidable means being movable by external pressure on said diaphragm.

10. An externally-resettable hermetically sealed thermostatic switch comprising a container; a header plate closing the open end of the container; at least two terminals electrically insulated from each other and mounted on said plate, said terminals projecting through the plate from one side thereof to the other; switch means within said container and connected to said terminals; a thermostatic element within the container and adapted to move said switch means so as to make and break an electric circuit between said terminals; electrical conductors attached to said terminals on the exterior side of said plate, said conductors being covered with moisture-proof electrically insulating material; and a molded moisture-proof electrically insulating cap covering at least the exterior surface of said header plate, said terminals, and a portion of said moisture-proof electrically insulating material, said cap being bonded to said moisture-proof electrically insulating material, and to said header plate, thereby to form a moisture-tight covering for said terminals and conductors; said closure plate being provided with a hole therethrough and said cap being provided with an interior cylindrical well having one end open and registering with said hole and having the other exterior end closed by a flexible diaphragm forming an integral part of said cap; and slidable means slidably mounted in said hole and said well and extending into the interior of said container, said slidable means being movable by external pressure on said diaphragm and comprising a cylindrical rod having one end portion larger in diameter than the other end portion; the wall of said well tapering inwardly from said hole to provide a decreasing diameter toward said diaphragm, the said one end portion of the cylindrical rod being a slidable fit in said hole, and the said other end portion of said rod being a loose fit at the diaphragm-end of said well, whereby said slidable means is axially guided by said hole and the diaphragm-end of said well.

11. An article of manufacture comprising a header plate; terminals hermetically sealed to and projecting through the header plate from one side thereof to the other side, the terminals being electrically insulated from the header plate; switch means carried by said terminals on one side of the header plate and being connected to said terminals so as to make and break an electrical circuit therebetween; electrical conductors attached to the terminals on the other side of the header plate and covered with a fluid-resistant electrically insulating material; and a fluid-resistant and electrical insulating cap bonded to said other side of the header plate and covering the surface of said other side, said terminals, and a portion of said fluid-resistant material, said header plate being provided with a hole therethrough and said cap being provided with an interior well having one end open and registering with said hole and a closed exterior end, said closed exterior end comprising a flexible diaphragm forming an integral part of said cap; and movable means positioned in said hole and said well and extending into the interior of said container, said movable means being movable by pressure on said diaphragm; the header plate, terminals, switch means, conductors, cap, and movable means comprising a unitary subassembly.

12. An externally-resettable sealed thermostat comprising a metal container; a closure plate closing an opening into said container; a thermostat element operatively mounted in said container; at least two terminals electrically insulated from each other and mounted on said closure plate, said terminals projecting through said plate from one side thereof to the other; switch means in said container and connected to said terminals, said thermostat element being adapted to move said switch means so as to make and break an electric circuit between said terminals; a molded moisture-proof electrically insulating cap covering the exterior surface of said closure plate and said terminals while leaving a portion of the metal of said container exposed to ambient temperature conditions, thereby to form a moisture-tight covering for said terminals and said plate, said closure plate being provided with a hole therethrough and said cap having a thin diaphragm section closing said hole; and movable means positioned between said diaphragm section and said thermostatic element, said movable means being movable by pressure on said diaphragm to reset said thermostat element and said control means.

References Cited in the file of this patent

UNITED STATES PATENTS

| | | |
|---|---|---|
| 2,409,483 | Gandelot | Oct. 15, 1946 |
| 2,667,553 | Moorhead et al. | Jan. 26, 1954 |
| 2,685,014 | Mang | July 27, 1954 |